(12) United States Patent
Kanda et al.

(10) Patent No.: US 6,214,454 B1
(45) Date of Patent: Apr. 10, 2001

(54) ELECTROMAGNETIC WAVE ABSORBING MATERIAL

(75) Inventors: Kazunori Kanda, Yao; Masato Morimoto, Hirakata; Hada Junichi; Fujita Takumi, both of Mie-gun, all of (JP)

(73) Assignees: Nippon Paint Co., Ltd., Osaka; Japan and Chiyoda Ute Co., Ltd., Mie, both of (JP)

( * ) Notice: Subject to any disclaimer, the term of this patent is extended or adjusted under 35 U.S.C. 154(b) by 0 days.

(21) Appl. No.: 08/937,464

(22) Filed: Sep. 25, 1997

(30) Foreign Application Priority Data

Sep. 25, 1996 (JP) ..................................... 8-275589
Dec. 28, 1996 (JP) ..................................... 8-358086
Feb. 19, 1997 (JP) ..................................... 9-052432

(51) Int. Cl.[7] ..................................... B32B 13/02
(52) U.S. Cl. .................. 428/294.7; 428/323; 428/457
(58) Field of Search ............................... 428/294.7, 323, 428/457

(56) References Cited

U.S. PATENT DOCUMENTS 5,422,174 * 6/1995 Shintani et al. .................. 428/320.2
5,447,564 * 9/1995 Xie et al. .............................. 106/644
5,562,870 * 10/1996 Bonin ........................................ 264/8

FOREIGN PATENT DOCUMENTS 8-018273 * 1/1996 (JP) .
09148779 * 6/1997 (JP) .

* cited by examiner

Primary Examiner—Elizabeth M. Cole
(74) Attorney, Agent, or Firm—Connolly Bove Lodge & Hutz LLP

(57) ABSTRACT

The present invention provides an electromagnetic wave absorbing material which comprises an electromagnetic wave absorbing layer comprising a hydraulic inorganic binder and a fibrous conductor.

The present invention also provides an electromagnetic wave absorbing material which comprises an electromagnetic wave absorbing layer comprising a hydraulic inorganic binder, a magnetic powder and a fibrous conductor.

7 Claims, No Drawings

ELECTROMAGNETIC WAVE ABSORBING MATERIAL

FIELD OF THE INVENTION

The present invention relates to a lightweight, flame-resistant, electromagnetic wave absorbing material.

BACKGROUND OF THE INVENTION

Technological innovations toward an integrated information society have been steadily made. Rapid progress has been made in information and communication technology, and not only personal information equipment and systems, typically for multimedia, but also equipment and systems for the communication infrastructure to be built up in the near future are expected to create a next big market.

The frequency bands intended for practical use in communication systems in Japan include two quasimicrowave bands, namely the 1.9 GHz band and 2.45 GHz band, one quasimillimetric wave band, namely the 19 GHz band, and one millimetric wave band, namely the 60 GHz band. In addition, in other countries, the 900 MHz band and 5.7 GHz band have been put to practical use in wireless LANs (local area networks).

The quasimicrowave bands are assigned to personal handy phone systems (PHSs) and indoor wireless equipment in medium speed wireless LANs, and the quasimillimetric wave band and millimetric wave band to indoor wireless equipment in high speed wireless LANs. As the demand in each frequency band grows, problems such as radio interference and wrong operation, which are due to mutual electromagnetic wave interference and delay spread, and tapping may possibly become serious.

In intelligent offices, in particular, which are equipped with a large number of communication and information apparatus, radio interference and wrong operation, which are due to mutual electromagnetic wave interference and delay spread, are apt to result. Furthermore, there are utensils such as furniture made of metal, which have a number of metal surfaces capable of reflecting electromagnetic waves, causing the problem of radio wave environment deterioration.

For improving the radio wave environment, electromagnetic wave absorbers comprising an electromagnetic wave absorbing material have so far been used. Known as the electromagnetic wave absorbing material is a composite material generally composed of ferrite and a binder. Good absorption is achieved by precisely controlling, depending on the frequency intended for use, not only the magnetic and dielectric characteristics but also the thickness of the composite material in the step of processing.

Particularly when an electromagnetic wave absorbing material is to be used as a building material, it should have durability, flame resistance and workability for fitting. Therefore, a number of electromagnetic wave absorbing materials have been proposed in which the main binder material is an inorganic material rather than an organic material. A number of building materials intended for electromagnetic wave shielding, which comprise an inorganic material, have also been proposed.

Thus, Japanese Kokai Publication Sho-49-71722 discloses an electromagnetic wave absorbing material prepared by incorporating a ferrite powder with a mean particle size of not less than 60 $\mu$m as a portion of the aggregate in a building material such as concrete or mortar to give an ability to absorb electromagnetic waves. In Japanese Kokai Publication Sho-53-25898, there is disclosed a method of producing electromagnetic wave absorbers which comprises incorporating magnetic dust mainly comprising ferrite into a board material such as cement, gypsum or asbestos. In Japanese Kokai Publication Hei-01-179400, there is disclosed a building material which comprises a board of gypsum admixed with, for example, not less than 50% of special conductive fiber yarn and which has antistatic and electromagnetic wave shielding functions.

In Japanese Kokai Publication Hei-04-74747, a conductive elastic mortar composition is disclosed which comprises, as main components, cement, gypsum, alumina cement, carbon fiber and a polymer admixture.

Japanese Kokai Publication Hei-06-122568 discloses an inorganic foamed material produced by allowing a hydraulic inorganic composition comprising a hydraulic inorganic substance, water and carbon fiber to foam and set.

According to these technologies, however, the electromagnetic wave absorbing materials are thick, hence poor in processability or workability for fitting. Furthermore, when such electromagnetic wave absorbing materials are used as building materials for intelligent offices or the like in which information and communication apparatus are used, their electromagnetic wave absorbing capacity is insufficient.

In Japanese Kokai Publication Hei-04-310555, gypsum moldings are disclosed which are produced by admixing hemihydrate gypsum or anhydrous gypsum containing 0.1 to 70% by weight of at least one kind of a magnetic material and a ferroelectric material with a water absorbing polymer including water within the structure thereof, followed by setting. These gypsum moldings may effectively be used as antistatic, magnetic, conductive, or ferroelectric materials.

However, this technology refers to the coercive force of said gypsum moldings and the resistance of the powder form materials but makes no specific mention of the electromagnetic wave absorbing capacity thereof. Hard ferrite, which is insufficient in electromagnetic wave absorbing capacity, is the only ferrite species used there. Furthermore, because of the use of the water absorbing polymer, there is the problem that the strength of the boards themselves decreases upon absorption of water.

In Japanese Kokai Publication Hei-06-209180, there is disclosed an electromagnetic wave absorbing inner wall material which mainly comprises gypsum, cement or calcium silicate and contains, as an electromagnetic wave loss-causing material, carbon, ferrite, a metal powder, a metal compound powder or a mixture of these. According to this technology, it is indeed possible to produce electromagnetic wave absorbing inner wall materials capable of coping with such respective bands as 70 to 400 MHz, 400 to 900 MHz, 900 MHz to 1.5 GHz and 1.5 to 3 GHz, but it is impossible to cope with such a broad band as 70 MHz to 1.5 GHz.

Japanese Kokai Publication Hei-07-202472 discloses an electromagnetic wave shielding material produced by integrally molding an electromagnetic wave reflecting material on one side of an electromagnetic wave absorbing material. According to this technology, however, since a metallic material, such as a metallic mesh material or lattice-like metallic member, is used as an electromagnetic wave absorbing material, it is necessary to integrally mold the electromagnetic wave reflector and electromagnetic wave absorber to give a shielding material. In addition, such material is heavy, hence unfavorably poor in workability for fitting when it is used as a wall, ceiling or like material.

Furthermore, such electromagnetic wave shielding material cannot equally absorb electromagnetic waves in all frequency bands remote from one another and ranging over quasimicrowave, quasimillimetric and millimetric bands, although said material has good electromagnetic wave absorbing ability in a specific frequency band. Accordingly, with the increasing use of such quasimicrowave and quasimillimetric bands as mentioned above, it is a requirement from the relevant industry that an electromagnetic wave absorbing material capable of equally absorbing electromagnetic waves in all frequency bands from quasimicrowave bands to millimetric wave bands be developed. For designing such electromagnetic wave absorbing material, it is necessary to investigate the conditions for ferrite manufacture according to the respective frequencies of the electromagnetic waves to be absorbed and produce ferrite under the conditions found suited. It is therefore difficult to realize arbitrary matched frequency characteristics.

On the other hand, Japanese Kokai Publication Hei-03-36795 discloses an electromagnetic wave absorbing material rendered capable of absorption in broad bands by controlling the spin orientation of sintered ferrite utilizing the magnetic force of the lower hard ferrite layer to thereby vary the complex permeability. For enabling electromagnetic wave absorption in broad bands by varying the complex permeability by means of magnetic force, however, matching by controlling the ferrite layer thickness is required and a powerful and heavy magnet is also required. The effect of this electromagnetic wave absorbing material in retaining the absorbing ability in broad bands is, as a matter of fact, not very marked.

In Japanese Kokai Publication Hei-08-83994, there is disclosed, as an electromagnetic wave absorbing material that can be used in broad bands, a multilayer electromagnetic wave absorbing material comprising a first layer consisting of a conductive substrate, a second layer composed of a magnetic metal oxide in fine powder form and a binder, and a third layer constituted of a magnetic metal in fine powder form and a binder, laminated together in that order.

With the electromagnetic wave absorbing material having said structure, it is possible to steadily absorb electromagnetic waves in the broad band range of 1 to 60 GHz with low reflection absorbing ability. Unlike the sintered ferrite board disclosed in Japanese Kokai Publication Hei-08-36785, said second layer, which is composed of a magnetic metal oxide in fine powder form and a binder, is characterized in that it has a high degree of freedom concerning the matching, although the absorbing capacity is generally limited. Therefore, such low-reflection material can prevent mutual interference and delay spread of electromagnetic waves in broad bands from quasimicrowave bands to quasimillimetric and millimetric bands.

Meanwhile, in recent years, the number of the so-called intelligent buildings has increased. Generally, such buildings structurally have a large number of windows and contain a large number of metallic furniture pieces and utensils, such as lockers. Therefore, for effective prevention of mutual interference and delay spread of electromagnetic waves in broad bands, it is important to fit electromagnetic wave absorbing materials on ceiling portions where wide areas can be secured. It is thus strongly required that the electromagnetic wave absorbing material should be lightweight and excellent in workability for fitting and, when used as a building material, fit well and can be used in the same manner as the conventional building materials. Said material should further have flame resistance or incombustibility, which is required of building materials in general, by way of precaution against fire.

In view of the foregoing, it is an object of the present invention to provide an electromagnetic wave absorbing material which can absorb electromagnetic waves in a narrow band or a plurality of band in frequencies from quasimicrowave bands to millimetric wave bands used for radio communication and also which is lightweight and is resistant to flame and is excellent in handling qualities and workability as a building material.

SUMMARY OF THE INVENTION

In one aspect, the present invention provides an electromagnetic wave absorbing material which comprises an electromagnetic wave absorbing layer comprising a hydraulic inorganic binder (a) and 0.01 to 1.0 part by weight per 100 parts by weight of said binder (a), of a fibrous conductor (b).

In another aspect, the present invention provides an electromagnetic wave absorbing material which comprises an electromagnetic wave absorbing layer comprising a hydraulic inorganic binder (a), a magnetic material powder (d) and a fibrous conductor (b).

DETAILED DESCRIPTION OF THE INVENTION

The electromagnetic wave absorbing material according to the first aspect of the present invention comprises an electromagnetic wave absorbing layer comprising a hydraulic inorganic binder (a) and a fibrous conductor (b).

The first aspect of the present invention is now described in detail.

Said hydraulic inorganic binder (a) is not limited to any particular species provided that it can set when admixed with water. Thus, it includes, for example, gypsum, lime, calcium silicate, magnesia cement, portland cement, alumina cement, roman cement, acid-resistant cement, refractory cement, water glass cement and the like. From the strength or water resistance viewpoint, portland cement and alumina cement are preferred. From the weight reduction, workability and electromagnetic wave absorbing capacity viewpoint, gypsum is preferred.

In the present specification, the proportion of said hydraulic inorganic binder (a) is expressed on the basis of the weight of the inorganic binder in the state set with water. Generally, hydraulic inorganic binders set upon admixing with an adequate amount of water, followed by standing at room temperature or with warming, further under pressure as necessary. In said setting process, the amount of water which is not used for said setting evaporates and is eliminated out of the system, hence the water content after setting is generally very low. Therefore, the weight of the inorganic binder after setting is approximately equal to the weight of the inorganic binder containing that amount of water which is necessary for setting.

The above-mentioned fibrous conductor (b) is not limited to any particular species but is preferably a metallic fibrous substance or carbonaceous fibrous substance. Said metallic fibrous substance includes, but is not limited to, metallic fibers made of simple substances such as stainless steel, brass, copper, aluminum, nickel, lead and the like, and alloys thereof; and metal-coated fibers produced from vegetable fibers, synthetic fibers, inorganic fibers and other fibers by surface treatment such as vapor deposition, plating or coating with metals. Said carbonaceous fibrous substance includes, but is not limited to, polyacrylonitrile-based carbon fiber, pitch-based carbon fiber, rayon-based carbon fiber and carbon whiskers.

Among these, metal-coated fibers and carbonaceous fibrous substances are preferred since they show good dispersibility in the step of electromagnetic wave absorbing layer production and provide good electromagnetic wave absorbing capacity. Since the fibrous conductor (b) is used in admixture with the above-mentioned hydraulic inorganic binder (a), it is desirable that said fibrous conductor (b) be excellent in water wettability and dispersion stability. Said fibrous conductor (b) is desirably excellent in both water wettability and dispersion stability, since even if it has good water wettability but if it curls up or is poor in fiber rigidity or flexibility, fiber entanglement tends to occur, leading to lump formation on the occasion of admixing with the hydraulic inorganic binder (a), which makes uniform dispersion difficult.

In the practice of the first aspect of the present invention, the fibrous conductor (b), which is used in a hydraulic system, is preferably a noncorrosive metallic fibrous substance or a carbonaceous fibrous substance having good corrosion resistance rather than an ordinary metallic fibrous substance, since the latter may offer a corrosion problem.

Said fibrous conductor (b) preferably has a specific gravity of not higher than 2.5. When it exceeds 2.5, the dispersion stability will decrease.

Said fibrous conductor (b) preferably has a fiber diameter of 5 to 50 $\mu$m. The fiber length is preferably 2 to 40 mm, more preferably 3 to 10 mm; longer fiber lengths tends to cause entanglement.

Said fibrous conductor (b) is used in an amount of 0.01 to 1.0 part by weight per 100 parts by weight of the hydraulic inorganic binder (a). At an addition level below 0.01 part by weight, the electromagnetic wave absorption increasing effect will be poor whereas at an addition level exceeding 1.0 part by weight, electromagnetic waves will be reflected by the electromagnetic wave absorbing layer surface, hence no sufficient electromagnetic wave absorbing ability will be obtained. The above range is thus critical.

In cases where gypsum is used as the hydraulic inorganic binder (a), the fibrous conductor (b) is used preferably in an amount of 0.01 to 0.8 part by weight. An addition level lower than 0.01 part by weight is insufficient to improve the electromagnetic wave absorbing capacity whereas an addition level exceeding 0.8 part by weight will unfavorably allow reflection of electromagnetic waves from the electromagnetic wave absorbing layer surface, leading to a decrease in electromagnetic wave absorbing capacity. A more preferred addition level is 0.01 to 0.6 part by weight.

In the practice of the first aspect of the present invention, at least one additive (c) selected from the group consisting of an expandable filler (c-1), a fibrous additive (c-2), a foaming agent (c-3), a water reducing agent (c-4) and a surfactant (c-5) may be incorporated for making the electromagnetic wave absorbing layer more lightweight, stabilizing the production process and further improving the electromagnetic wave absorbing capacity, in addition to the hydraulic inorganic binder (a) and the fibrous conductor (b).

Said additive (c) is preferably used in an amount of 0.001 to 20 parts by weight per 100 parts by weight of the hydraulic inorganic binder (a). At an addition level below 0.001 part by weight, the effect of addition is very limited while at an addition level exceeding 20 parts by weight, the physical strength of the absorbing layer may unfavorably decrease or the producibility thereof may become poor. In cases where said additive (c) is an expandable filler (c-1), the addition level thereof is preferably 0.01 to 20 parts by weight. In cases where said additive (c) is a foaming agent (c-3), water reducing agent (c-4) or surfactant (c-5), the addition level thereof is more preferably 0.001 to 5 parts by weight.

The electromagnetic wave absorbing layer can be made lightweight by incorporating the expandable filler (c-1). By incorporating the foaming agent (c-3), stable foaming can be realized in the step of formation of the electromagnetic wave absorbing layer, hence the production process can be stabilized. Incorporation of the water reducing agent (c-4) can result in an improved flowability of the slurry for forming the hydraulic inorganic binder (a) and in a reduction in the amount of water required. Further, by incorporating the surfactant (c-5), the flowability of the slurry for forming the hydraulic inorganic binder (a) can be adjusted and the production process can be stabilized.

For making the electromagnetic wave absorbing layer more lightweight, the incorporation of an expandable filler (c-1) as the additive (c) is preferred. When the expandable filler (c-1) as additive (c) is contained in the electromagnetic wave absorbing layer, the fibrous conductor (b) can be incorporated therein in a sufficiently dispersed state and, at the same time, the specific gravity of the electromagnetic wave absorbing layer can be reduced. It is thus possible to make said layer lightweight without reducing the electromagnetic wave absorbing capacity.

Said expandable filler (c-1) is not limited to any particular species but may be an inorganic expandable filler or an organic expandable filler.

Said inorganic expandable filler includes, but is not limited to, natural lightweight aggregates such as lapilli; artificial lightweight aggregates such as expanded shale, expanded clay, expanded vermiculite, expanded perlite, expanded obsidian, coal cinders, fused fly ash, silica balloons, perlite, shirasu balloons, glass balloons, etc. These may be used singly or two or more of them may be used in combination.

Said organic expandable filler includes, but is not limited to, foamed polystyrene beads, foamed polyurethane beads, hollow acrylic resin balloons, hollow acrylic modification resin balloons, melamine resin balloons, hollow urethane modification resin balloons and the like. These may be used either singly or in combination. They may be used in combination with one or more of the above-mentioned inorganic expandable fillers.

The expandable filler (c-1) may be any of the inorganic expandable fillers and organic expandable fillers mentioned above but is preferably the one which satisfied the conditions that it should be lightweight, high in strength, spherical, good in surface smoothness, narrow in grain size distribution range, low in water absorbency, free of water-soluble components and incapable of swelling upon contact with water, for instance.

In other words, the expandable filler (c-1) is preferably the one which causes neither an increase in the amount of water for kneading in the step of kneading the hydraulic inorganic binder (a) and water together nor a reduction in the flowability of the slurry resulting from kneading the hydraulic inorganic binder (a) and water together and which even if it absorbs water, allows the water absorbed to volatilize in the step of drying.

Thus, as preferred examples of the expandable filler (c-1) which meet the above requirements, there may be mentioned expanded vermiculite, perlite, shirasu balloons, foamed polystyrene beads, foamed polyurethane beads and hollow acrylic resin balloons.

The structure of the expandable filler (c-1) is not critical. Mention may be made, for example, of the balloon structure with the inside being empty and the outside forming a shell; the sponge structure with each filler grain containing an independent bubble or interconnected bubbles; and a structure resulting from a combination of these.

Expandable fillers having said balloon structure can be readily obtained by high temperature firing for expansion. Expandable fillers having said sponge structure can be readily produced, for example, by microfoaming using a gas generating agent or by synthesizing grains containing a liquid substance and eliminating said liquid substance from said grains.

The specific gravity of said expandable filler (c-1) is not critical but, generally, said filler preferably has an apparent specific gravity of 0.05 to 1.70 and a weight per unit volume of 0.01 to 0.50 kg/L.

The mean grain size of said expandable filler (c-1) is not critical but, generally, a size between 0.05 $\mu$m and 5 mm is preferred. Among the expandable fillers (c-1) mentioned above, the inorganic expandable fillers generally have a mean grain size of 0.1 to 5 mm, which is greater as compared with the organic expandable fillers. The mean grain size of the organic expandable fillers can be adjusted relatively freely by modifying the synthesis conditions and synthesizing process.

The addition level of said expandable filler (c-1) is preferably 0.01 to 20 parts by weight per 100 parts by weight of the hydraulic inorganic binder (a). At a level below 0.01 part by weight, the effect of addition of the expandable filler (c-1) is slight and the weight reducing effect is little. At a level exceeding 20 parts by weight, the physical strength of the electromagnetic wave absorbing layer unfavorably decreases although the desired weight reducing effect can be obtained.

Said fibrous additive (c-2) includes, but is not limited to, natural vegetable fibers such as cotton and hemp; inorganic fibers such as glass fiber and asbestos; synthetic fibers such as polyester, polyacrylonitrile, polyamide and polypropylene fibers; needle-like reinforcing fibers such as wollastonite, and the like. Said fibrous additive may be used for reinforcing the electromagnetic wave absorbing layer.

As said foaming agent (c-3), water reducing agent (c-4) and surfactant (c-5), there may be mentioned, for example, alkylbenzenesulfonic acid salts such as sodium p-dodecylbenzenesulfonate; various salts such as sodium lauryl sulfate, ammonium lauryl sulfate, triethanolamine lauryl sulfate and polyoxyethylene lauryl ether sulfate etc.; surfactants of the polymethylsiloxane type; polypeptides derived from protein hydrolyzates; organic compounds such as polyethylene oxides, polyvinyl alcohol and various salts of stearic acid; inorganic compounds such as various salts of aluminic acid; and cellulose compounds such as methylcellulose, hydroxymethylcellulose and carboxymethylcellulose. For use for the purpose of foaming, there may be further mentioned, for instance, metal powders such as aluminum and magnesium powders; aqueous hydrogen peroxide solutions, sodium bicarbonate and ammonium carbonate. These may be used either singly or in combination. These additives are more preferably used at an addition level of 0.005 to 0.8% by weight.

The thickness of said electromagnetic wave absorbing layer is preferably 5 to 50 mm. If thinner than 5 mm, the electromagnetic wave absorbing layer will be weak in physical strength. When thicker than 50 mm, said layer will be too heavy. In cases where the electromagnetic wave absorbing material is used as a building material, a thickness outside said range will result in poor workability for fitting and in poor fitness. A preferred thickness is 7 to 25 mm.

The specific gravity of said electromagnetic wave absorbing layer is preferably 0.50 to 1.2. If it is lower than 0.50, the electromagnetic wave absorbing capacity will be insufficient. A specific gravity exceeding 1.2 is unfavorable since the electromagnetic wave absorbing layer becomes too heavy. In the practice the present invention according to the first aspect thereof, a specific gravity of 0.60 to 1.0 is preferred from the viewpoint of workability for fitting and, for rendering the material comparable to gypsum boards in conventional use, a specific gravity of 0.50 to 0.90 is preferred.

The electromagnetic wave absorbing material according to the first aspect of the present invention preferably has an electromagnetic wave reflecting layer in addition to the electromagnetic wave absorbing layer. When the electromagnetic wave absorbing material according to the first aspect of the present invention comprises only the electromagnetic wave absorbing layer, the main effect obtainable is an absorption loss effect resulting from transmission of electromagnetic waves through the electromagnetic wave absorbing material according to the first aspect of the present invention. When said material has an electromagnetic wave reflecting layer, a reflection loss effect can further be obtained in addition to the absorption loss effect.

Said electromagnetic wave reflecting layer is not limited to any particular species but preferably comprises a conductive substrate, metal vapor deposited film, metal foil or metal powder. These may be used singly or two or more of them may be used in combination. The electromagnetic wave reflecting layer may serve also as a supporting member.

The electromagnetic wave reflecting layer preferably has a shielding ability of not less than 20 dB, more preferably not less than 30 dB.

The above-mentioned conductive substrate is not limited to any particular species provided that it can provide a conductivity-due shielding ability of not less than 20 dB, preferably not less than 30 dB. Thus, it includes, among others, sheets of metals such as copper, aluminum, steel, iron, nickel, stainless steel and brass; plated sheets of such metals; metal cloths; and steel sheets thermally or electrically plated with aluminum, zinc or copper, etc. on iron sheets. Such conductive substrates may be surface-treated or primer-treated for improving interlayer adhesion, such as in the case of precoated steel sheets.

The above-mentioned metal vapor deposited film includes, but is not limited to, nonconductive substrates, such as plastic sheets, sheets of paper, PET films and other synthetic paper sheets, with a vapor deposited layer of aluminum or the like thereon.

The above-mentioned metal foil includes, but is not limited to, metal foils produced from those metals which are usable as the conductive substrate mentioned above. The above-mentioned metal powder includes, but is not limited to, metal powders prepared from those metals which are usable as the conductive substrate mentioned above.

In the practice of the present invention according to the first aspect thereof, such nonconductive substrates as paper sheets and PET films, with aluminum or a like metal vapor-deposited thereon, are preferred from the building material weight reduction viewpoint.

The above-mentioned electromagnetic wave reflecting layer may be a nonconductive substrate, such as a plastic sheet, paper or synthetic paper, provided with a conductive paint film comprising a metal selected from those metals usable as the conductive substrate mentioned above and a binder; a metallized material provided with a layer of a metal such as copper or nickel by nonelectrolytic plating.

In the practice of the present invention according to the first aspect thereof, the electromagnetic wave reflecting layer preferably has a thickness of 50 μm to 3 mm. When thinner than 50 μm, the electromagnetic wave reflecting layer will have a reduced mechanical strength whereas when thicker than 3 mm, the electromagnetic wave reflecting layer will be too heavy, hence not suited for practical use.

The electromagnetic wave absorbing material according to the first aspect of the present invention can be produced by forming the above-mentioned electromagnetic absorbing layer and then providing-the above-mentioned electromagnetic wave reflecting layer. The method of providing said electromagnetic wave reflecting layer is not critical. For example, said electromagnetic wave reflecting layer can suitably be adhered to one side of said electromagnetic wave absorbing layer. The adhesion can be realized by sticking a paper sheet having a vapor deposited aluminum layer, a paper sheet having an adhered aluminum foil, or an aluminum foil, which serves as the electromagnetic wave reflecting layer, to one side of the electromagnetic wave absorbing layer using an adhesive or the like.

The first aspect of the present invention provides two kinds of electromagnetic wave absorbing material, namely (1) the one comprising the electromagnetic wave absorbing layer alone and (2) the one comprising the electromagnetic wave absorbing layer further provided with the electromagnetic wave reflecting layer.

The electromagnetic wave absorbing material comprising the electromagnetic wave absorbing layer alone (material (1)) as such may be low in absorbing ability. When, however, it is installed on the electromagnetic wave reflecting metal surface of a piece of metal furniture, wall, ceiling or the like made of a steel sheet, galvanized steel sheet, aluminum sheet or the like, either as such or coated with a paint, said metal surface functions as if it were the electromagnetic wave reflecting layer mentioned above, whereby a more effective electromagnetic wave absorbing effect can be obtained. In that case, the electromagnetic wave absorbing material comprising the electromagnetic wave absorbing layer alone can be fixed to such metal surface through the intermediary of an adhesive layer, by using bolts for fitting or the like, by using adhesive magnetic sheets, or through the intermediary of a frame, for instance.

Now, taking the cases where the electromagnetic wave absorbing layer is a gypsum board, ALC (autoclaved lightweight concrete) board, mortar board or cement board as examples, the method of producing the electromagnetic wave absorbing material according to the first aspect of the present invention is described in detail.

1. Gypsum board

Calcined gypsum, a fibrous conductor (b) and water, if necessary together with an expandable filler, fibrous additive, organic binder, foaming agent, stabilizer, dispersing agent, water reducing agent, aggregate and/or the like, are sufficiently mixed up in a mixer to give a slurry, which is then spread on a base paper sheet for gypsum board. After thickness adjustment, a further base paper sheet for gypsum board is applied to thereby sandwich the slurry layer and the whole is warmed to thereby allow said slurry to set and dry, whereby an electromagnetic wave absorbing material according to the first aspect of the present invention which comprises an electromagnetic wave absorbing layer alone is obtained. When desired, a paper sheet having a vapor deposited aluminum layer, a paper sheet having an aluminum foil adhered thereto, an aluminum foil or the like, which is to serve as the electromagnetic wave reflecting layer, is affixed to one side of the above-obtained electromagnetic wave absorbing layer using an adhesive or by some other means, whereby an electromagnetic wave absorbing material according to the first aspect of the present invention which comprises the electromagnetic wave reflecting layer is obtained.

In cases where the above-mentioned expandable filler is used, the fibrous conductor (b) is preferably used in an amount of 0.01 to 0.08 part by weight, and the expandable filler in an amount of 0.1 to 15 parts by weight, per 100 parts by weight of calcined gypsum.

In that case, when the expandable filler is used in an amount smaller than 0.1 part by weight, the weight reducing effect will be unsatisfactory. An addition level exceeding 15 parts by weight is unfavorable since the adhesion between the base paper for gypsum board and the electromagnetic wave absorbing layer forming material decreases or the physical strength of the electromagnetic wave absorbing layer decreases, although the weight reducing effect is obtained.

2. ALC board

Portland cement, calcium carbonate and pulverized aluminum are used as the hydraulic inorganic binder (a). Said components of the hydraulic inorganic binder (a), a fibrous conductor (b) and water, if necessary together with a fibrous additive, expandable filler (c-1), foaming agent, inorganic filler, water-soluble polymer and/or the like, are sufficiently mixed up in a mixer to give a slurry. This is cast into a mold or framework, aged at about 60° C. and, after setting, dried at 105° C. to give an electromagnetic wave absorbing layer according to the first aspect of the present invention which comprises an electromagnetic wave absorbing layer alone. When desired, an electromagnetic wave reflecting layer is affixed to one side of the above-obtained electromagnetic wave absorbing layer using an adhesive or by some other means, whereby an electromagnetic wave absorbing material according to the first aspect of the present invention which has the electromagnetic reflecting layer is obtained.

In the above case, the fibrous conductor (b) is preferably used in an amount of 0.01 to 1.0 part by weight per 100 parts by weight of the hydraulic inorganic binder (a). For further weight reduction, the amount of the fibrous conductor (b) is preferably 0.01 to 0.6 part by weight per 100 parts by weight of the hydraulic inorganic binder (a). Weight reduction may also be attained by adding a considerable amount of a foaming agent to thereby increase the bubble content.

In cases where the expandable filler (c-1) is used for further weight reduction, the fibrous conductor (b) is preferably used in an amount of 0.01 to 1.0 part by weight, and the expandable filler (c-1) in an amount of 0.01 to 20 parts by weight, per 100 parts by weight of the hydraulic inorganic binder (a).

3. Mortar

Cement, gypsum and alumina cement are used as the hydraulic inorganic binder (a). Said components of the hydraulic inorganic binder (a), a fibrous conductor (b) and water, if necessary together with a fibrous additive, expandable filler (c-1), polymer additive, foaming agent, inorganic filler, water-soluble polymer, water reducing agent, accelerator, retarder and/or the like, are sufficiently mixed up in a mixer. The resulting slurry is cast into a framework and dried at ordinary temperature (about 20° C.), whereby an electromagnetic wave absorbing material according to the first aspect of the present invention which comprises an electromagnetic wave absorbing layer alone is obtained. When desired, an electromagnetic wave reflecting layer is affixed to one side of the above-obtained electromagnetic wave absorbing layer using an adhesive or by some other means, whereby an electromagnetic wave absorbing material according to the first aspect of the present invention which has the electromagnetic reflecting layer is obtained.

In that case, the fibrous conductor (b) is preferably used in an amount of 0.01 to 1.0 part by weight per 100 parts by weight of the hydraulic inorganic binder (a). For further weight reduction, the fibrous conductor (b) is preferably used in an amount of 0.02 to 0.8 part by weight per 100 parts by weight of the hydraulic inorganic binder (a).

In cases where the expandable filler (c-1) is used for further weight reduction, the fibrous conductor (b) is preferable used in an amount of 0.01 to 0.6 part by weight, and the expandable filler (c-1) in an amount of 0.01 to 20 parts by weight, per 100 parts by weight of the hydraulic inorganic binder (a).

4. Cement board

Portland cement, a fibrous conductor (b) and water, if necessary together with a fibrous additive, expandable filler (c-1), polymer additive, foaming agent, inorganic filler, water-soluble polymer, water reducing agent (c-4), accelerator, retarder and/or the like, are sufficiently mixed up in a mixer. The resulting slurry is cast into a framework, dehydrated under pressure and then aged for setting, whereby an electromagnetic wave absorbing material according to the first aspect of the present invention which comprises an electromagnetic absorbing layer is obtained. When desired, an electromagnetic wave reflecting layer is affixed to one side of the above-obtained electromagnetic wave absorbing layer using an adhesive or by some other means, whereby an electromagnetic wave absorbing material according to the first aspect of the present invention which has the electromagnetic reflecting layer is obtained.

In the above case, the fibrous conductor (b) is preferably used in an amount of 0.01 to 1.0 part by weight per 100 parts by weight of portland cement.

When the above-mentioned expandable filler (c-1) is used, the fibrous conductor (b) is preferably used in an amount of 0.01 to 0.8 part by weight, and the expandable filler (c-1) in an amount of 0.01 to 20 parts by weight, per 100 parts by weight of portland cement.

The electromagnetic wave absorbing material according to the first aspect of the present invention can be designed so that it has an electromagnetic wave absorbing ability of about $-3$ to $-30$ dB for electromagnetic waves in a relatively narrow band used for radio communication in such communication system frequency bands as 1 to 60 GHz. Therefore, when it is used as a building material such as a wall, ceiling or floor material, unnecessary indoor electromagnetic waves are gradually absorbed during repeated reflection upon falling on the wall, ceiling, floor or the like, whereby the radio wave environment as a whole is improved.

The electromagnetic wave absorbing material according to the first aspect of the present invention, since its electromagnetic wave absorbing layer comprises an inorganic binder such as gypsum, is extremely lightweight and is resistant to flame. Thus, it is excellent in handling properties, workability and other properties required of a building material. Therefore, the electromagnetic wave absorbing material according to the first aspect of the present invention is suitable as a building material for use in intelligent buildings or the like where interference and operation errors due to mutual interference or delay spread of electromagnetic waves are matters of no small concern.

The electromagnetic wave absorbing material according to the second aspect of the present invention comprises an electromagnetic wave absorbing layer comprising a hydraulic inorganic binder (a), a magnetic powder (d) and a fibrous conductor (b).

The second aspect of the present invention is now described in detail.

Preferred as said magnetic powder (d) is a soft magnetic one, inclusive of a metal oxide magnetic material or metal magnetic material. Said metal oxide magnetic material includes, but is not limited to, ferrites resulting from combination of $Fe_2O_3$ and MnO, ZnO, NiO, MgO, CuO, $Li_2O$, etc.; spinel type ferrites such as NiO—MnO—ZnO—$Fe_2O_3$, MnO—ZnO—$Fe_2O_3$, NiO—ZnO—$Fe_2O_3$, etc.; garnet type ferrites; spinel type (cubic) $\lambda$—$Fe_2O_3$ and $\lambda$—$Fe_4O_4$, among others.

The metal oxide magnetic material preferably has a mean particle size of 1 to 30 $\mu$m, more preferably 1 to 5 $\mu$m.

Said metal magnetic material includes, but is not limited to, an Fe—Si—Al alloy (Sendust), a Ni—Fe alloy (Permalloy), a Co—Fe alloy and a Fe-based or Co-based amorphous alloy, among others.

The metal magnetic material preferably has a mean particle size of 1 to 30 $\mu$m.

In the practice of the present invention according to the second aspect thereof, the use of a metal oxide magnetic material as the magnetic powder is preferred so that the weight of the electromagnetic wave absorbing material can be reduced and the electromagnetic wave absorbing ability can be increased. More preferred are spinel type ferrite magnetic powders in which $Fe_2O_3$ is combined with MnO, ZnO, NiO or MgO. Still more preferred are a Mn—Mg—Zn ferrite magnetic powder and a Mn—Zn ferrite magnetic powder.

In the practice of the present invention according to the second aspect thereof, the magnetic powder (d) may be surface-treated with a coupling agent such as a silane, titanate or aluminate coupling agent; an additive for improving the wettability and/or flowability of the magnetic powder, such as a surfactant, wetting agent, viscosity reducing agent, stabilizer or the like; a resin, for instance. By such surface treatment, it is possible to introduce functional groups providing the magnetic powder (d) with reactivity or functional groups dominating the wettability and, therefore, improve the wettability for the hydraulic inorganic binder (a) or the dispersibility and dispersion stability in the electromagnetic wave absorbing layer.

The hydraulic inorganic binder (a) and the magnetic powder (d) are preferably used in respective amounts of 30 to 90 parts by weight and 70 to 10 parts by weight per 100 parts by weight of the sum total of the hydraulic inorganic binder (a) and magnetic powder (d). When the amount of the hydraulic inorganic binder (a) is smaller than 30 parts by weight and the amount of the magnetic powder (d) exceeds 70 parts by weight, the producibility of the electromagnetic wave absorbing layer becomes poor and shows a decreased bending strength, hence fails to show satisfactory physical properties, the proportion of the magnetic powder becomes excessive and the electromagnetic wave absorbing layer becomes too heavy. If, conversely, the amount of the hydraulic inorganic binder (a) exceeds 90 parts by weight and the amount of the magnetic powder (d) is smaller than 10 parts by weight, the electromagnetic wave absorbing layer shows an insufficient electromagnetic wave absorbing capacity, hence is no longer suited for practical use.

When gypsum or calcium silicate is used as the hydraulic inorganic binder (a), the hydraulic inorganic binder (a) is used in an amount of 55 to 90 parts by weight and the magnetic powder (d) in an amount of 45 to 10 parts by weight per 100 parts by weight of the sum total of the hydraulic inorganic binder (a) and magnetic powder (d). The proportion of the magnetic powder (d) can thus be reduced and the weight of the electromagnetic wave absorbing layer obtained can be reduced. In particular when the hydraulic inorganic binder (a) is gypsum, a satisfactory electromagnetic wave absorbing capacity can be obtained in the above-mentioned lowered range of the proportion of the magnetic powder (d). A smaller proportion of the hydraulic inorganic binder (a) than 55 parts by weight and a higher proportion of the magnetic powder (d) than 45 parts by weight are undesirable since the electromagnetic wave absorbing layer becomes too heavy and the cost rises, although the electromagnetic wave absorbing capacity becomes sufficient. A higher proportion of the hydraulic inorganic binder (a) than 90 parts by weight and a smaller proportion of the magnetic powder (d) than 10 parts by weight will result in a low electromagnetic wave absorbing ability in the several GHz bands.

In the practice of the present invention according to the second aspect thereof, a carbonaceous fibrous substance, which has better corrosion resistance rather than a metallic fibrous substance which may produce a corrosion problem, is preferred as the fibrous conductor (b), since said fibrous conductor is used in a hydraulic system.

The fibrous conductor (b) is preferably used in an amount of 0.005 to 1.0 part by weight per 100 parts by weight of the sum total of the hydraulic inorganic binder (a) and magnetic powder (d). At a level below 0.005 part by weight, the electromagnetic wave absorbing capacity increasing effect will be slight. At a level exceeding 1.0 part by weight, electromagnetic waves are reflected on the electromagnetic wave absorbing layer surface, hence a satisfactory electromagnetic wave absorbing capacity cannot be obtained.

When gypsum is used as the hydraulic inorganic binder (a), the fibrous conductor (b) is preferably used in an amount of 0.01 to 0.8 part by weight. A level below 0.01 part by weight is insufficient to improve the electromagnetic wave absorbing ability whereas a level exceeding 0.8 part by weight unfavorably causes reflection of electromagnetic waves on the electromagnetic wave absorbing layer surface, whereby the electromagnetic wave absorbing ability is lowered.

In the practice of the present invention according to the second aspect thereof, another fibrous substance may be used in addition to the fibrous conductor (b). Said other fibrous substance is not particularly limited but includes those mentioned above as examples of the fibrous additive. Said other fibrous substance may be used for the purpose of reinforcing the electromagnetic wave absorbing layer.

In the practice of the present invention according to the second aspect thereof, for rendering the electromagnetic wave absorbing layer more lightweight, it is desirable that an expandable filler (c-1) be contained in the hydraulic inorganic binder (a), magnetic powder (d) and fibrous conductor (b) in the step of electromagnetic wave absorbing layer formation. The conventional methods of weight reduction, for example the method comprising using a foaming agent in large amounts and the method comprising causing foaming by intense agitation, cannot attain a uniformly dispersed state because the dispersion stability decreases at the gas-liquid interface of the resulting bubbles and thereby the magnetic powder tends to aggregate. Moreover, the electromagnetic wave absorbing ability thereby decreases.

When the expandable filler (c-1) is incorporated into the electromagnetic wave absorbing layer, the magnetic powder (d) and fibrous conductor (b) can be incorporated each in a sufficiently dispersed state and at the same time the specific gravity of the electromagnetic wave absorbing layer can be reduced. Thus, weight reduction can be achieved without reducing the electromagnetic wave absorbing ability.

The addition level of said expandable filler (c-1) is preferably 0.01 to 20 parts by weight per 100 parts of the sum total of the hydraulic inorganic binder (a) and magnetic powder (d). At a level below 0.01 part by weight, the effect of addition of the expandable filler (c-1) is poor, hence the weight reducing effect cannot be obtained. A level exceeding 20 parts by weight unfavorably reduces the physical strength of the electromagnetic wave absorbing layer, although the weight reducing effect can be obtained.

In the practice of the present invention according to the second aspect thereof, the thickness of the electromagnetic wave absorbing layer is preferably 5 to 50 mm. When thinner than 5 mm, the electromagnetic wave absorbing layer will be weak in physical strength. When thicker than 50 mm, said layer will be too heavy. In cases where the electromagnetic wave absorbing material is used as a building material, a thickness outside said range will result in poor workability for fitting and in poor fitness. A preferred thickness is 7 to 25 mm.

The specific gravity of said electromagnetic wave absorbing layer is preferably 0.50 to 1.65. If it is lower than 0.50, the electromagnetic wave absorbing capacity will be insufficient. A specific gravity exceeding 1.65 is unfavorable since the electromagnetic wave absorbing layer becomes too heavy. In the practice of the present invention according to the second aspect thereof, a specific gravity of 0.60 to 1.20 is preferred from the viewpoint of workability for fitting and, for rendering the material comparable to gypsum boards in conventional use, a specific gravity of 0.60 to 1.00 is preferred.

The electromagnetic wave absorbing material according to the second aspect of the present invention preferably has an electromagnetic wave reflecting layer in addition to the electromagnetic wave absorbing layer. Said electromagnetic wave reflecting layer is not limited to any particular species but preferably comprises a conductive substrate, metal vapor deposited film, metal foil or metal powder. These may be used singly or two or more of them may be used in combination. The electromagnetic wave reflecting layer may serve also as a supporting member.

The electromagnetic wave reflecting layer preferably has a shielding ability of not less than 20 dB, more preferably not less than 30 dB.

The above-mentioned conductive substrate is not limited to any particular species provided that it can provide a conductivity-due shielding ability of not less than 20 dB, preferably not less than 30 dB. Thus, it includes, among others, those mentioned above as examples thereof referring to the first aspect of the present invention. Such conductive substrates may be surface-treated or primer-treated for improving interlayer adhesion, such as in the case of pre-coated steel sheets.

The above-mentioned electromagnetic wave reflecting layer may be a nonconductive substrate provided with a conductive paint film, and a metallized material, as mentioned in the first aspect of the present invention.

Said electromagnetic wave reflecting layer preferably has a thickness of 50 $\mu$m to 3 mm. When thinner than 50 $\mu$m, the electromagnetic wave reflecting layer will have a reduced mechanical strength whereas when thicker than 3 mm, the electromagnetic wave reflecting layer will be too heavy, hence not suited for practical use.

In the practice of the present invention according to the second aspect thereof, the above-mentioned electromagnetic reflecting layer is preferably provided after formation of the electromagnetic wave absorbing layer. The method of providing said electromagnetic wave reflecting layer is not critical. For example, said electromagnetic wave reflecting layer can suitably be adhered to one side of said electromagnetic wave absorbing layer. The adhesion can be realized by sticking a paper sheet having a vapor deposited aluminum layer, a paper sheet having an adhered aluminum foil, or an aluminum foil, which serves as the electromagnetic wave reflecting layer, to one side of the electromagnetic wave absorbing layer using an adhesive or the like.

In the following, the method of producing the electromagnetic wave absorbing material according to the second aspect of the present invention is described in detail, taking the cases where the electromagnetic wave absorbing layer is a gypsum board, ALC board, mortar board or cement board as examples.

5. Gypsum board

Calcined gypsum, a magnetic powder (d), a fibrous conductor (b) and water, if necessary together with an expandable filler (c-1), organic binder, foaming agent, stabilizer, dispersing agent, water reducing agent, aggregate and/or the like, are sufficiently mixed up in a mixer to give a slurry, whereby an electromagnetic wave absorbing layer is obtained in the same manner as the first invention. When desired, a paper sheet having a vapor deposited aluminum layer, a paper sheet having an aluminum foil adhered thereto, an aluminum foil or the like, which is to serve as the electromagnetic wave reflecting layer, is affixed to one side of the above-obtained electromagnetic wave absorbing layer using an adhesive or by some other means, whereby an electromagnetic wave absorbing material is obtained.

In cases where the above-mentioned expandable filler (c-1) is used, calcined gypsum is preferably used in an amount of 55 to 90 parts by weight, the magnetic powder (d) in an amount of 45 to 10 parts by weight, the fibrous conductor (b) in an amount of 0.01 to 0.8 part by weight, and the expandable filler (c-1) in an amount of 0.1 to 15 parts by weight, per 100 parts by weight of the sum total of calcined gypsum and the magnetic powder (d).

6. ALC board

Portland cement, calcium carbonate and pulverized aluminum are used as the hydraulic inorganic binder (a). Said components of the hydraulic inorganic binder (a), a magnetic powder (d), a fibrous conductor (b) and water, if necessary together with a further fibrous substance, expandable filler (c-1), foaming agent, inorganic filler, water-soluble polymer and/or the like, are sufficiently mixed up in a mixer to give a slurry, whereby an electromagnetic wave absorbing layer and an electromagnetic wave absorbing material is obtained in the same manner as the first invention.

In the above case, the fibrous conductor (b) is preferably used in an amount of 0.005 to 0.2 part by weight per 100 parts by weight of the sum total of the hydraulic inorganic binder (a) and magnetic powder (d). For further weight reduction, the hydraulic inorganic binder (a) is preferably used in an amount of 65 to 85 parts by weight, the magnetic powder (d) in an amount of 35 to 15 parts by weight and the fibrous conductor (b) in an amount of 0.01 to 0.1 part by weight, per 100 parts by weight of the sum total of the hydraulic inorganic binder (a) and magnetic powder (d). Weight reduction may also be attained by adding a considerable amount of a foaming agent to thereby increase the bubble content.

In cases where the expandable filler (c-1) is used for further weight reduction, the hydraulic inorganic binder (a) is preferably used in an amount of 55 to 90 parts by weight, the magnetic powder (d) in an amount of 45 to 10 parts by weight, the fibrous conductor (b) in an amount of 0.01 to 0.8 part by weight and the expandable filler (c-1) in an amount of 0.01 to 20 parts by weight, per 100 parts by weight of the sum total of the hydraulic inorganic binder (a) and magnetic powder (d).

7. Mortar

Cement, gypsum and alumina cement are used as the hydraulic inorganic binder (a). Said components of the hydraulic inorganic binder (a), a magnetic powder (d), a fibrous conductor (b) and water, if necessary together with a further fibrous substance, expandable filler (c-1), polymer additive, foaming agent, inorganic filler, water-soluble polymer, water reducing agent, accelerator, retarder and/or the like, are sufficiently mixed up in a mixer to give a slurry, whereby an electromagnetic wave absorbing layer and an electromagnetic wave absorbing material is obtained in the same manner as the first invention.

In that case, the fibrous conductor (b) is preferably used in an amount of 0.005 to 0.2 part by weight per 100 parts by weight of the sum total of the hydraulic inorganic binder (a) and magnetic powder (d). For further weight reduction, the hydraulic inorganic binder (a) is preferably used in an amount of 65 to 85 parts by weight, the magnetic powder (d) in an amount of 35 to 15 parts by weight and the fibrous conductor (b) in an amount of 0.01 to 0.1 part by weight, per 100 parts by weight of the sum total of the hydraulic inorganic binder (a) and magnetic powder (d).

In cases where the expandable filler (c-1) is used for further weight reduction, the hydraulic inorganic binder (a) is preferably used in an amount of 55 to 90 parts by weight, the magnetic powder (d) in an amount of 45 to 10 parts by weight, the fibrous conductor (b) in an amount of 0.01 to 0.2 part by weight and the expandable filler (c-1) in an amount of 0.01 to 20 parts by weight, per 100 parts by weight of the sum total of the hydraulic inorganic binder (a) and magnetic powder (d).

8. Cement board

Portland cement, a magnetic powder (d), a fibrous conductor (b) and water, if necessary together with a further fibrous substance, expandable filler (c-1), polymer additive, foaming agent, inorganic filler, water-soluble polymer, water reducing agent, accelerator, retarder and/or the like, are sufficiently mixed up in a mixer to give a slurry, whereby an electromagnetic wave absorbing layer and an electromagnetic wave absorbing material is obtained in the same manner as the first invention.

In the above case, portland cement is preferably used in an amount of 55 to 90 parts by weight, the magnetic powder (d) in an amount of 45 to 10 parts by weight and the fibrous conductor (b) in an amount of 0.01 to 0.8 part by weight, per 100 parts by weight of the sum total of portland cement and the magnetic powder (d).

When the above-mentioned expandable filler (c-1) is used, portland cement is preferably used in an amount of 55 to 90 parts by weight, the magnetic powder (d) in an amount of 45 to 10 parts by weight, the fibrous conductor (b) in an amount of 0.01 to 0.4 part by weight, and the expandable filler (c-1) in an amount of 0.01 to 20 parts by weight, per 100 parts by weight of the sum total of portland cement and the magnetic powder (d).

The electromagnetic wave absorbing material according to the second aspect of the present invention can be designed so that it has an electromagnetic wave absorbing ability of about −3 to −20 dB for electromagnetic waves in a plurality of band used for radio communication in such communication system frequency bands as 1 to 60 GHz. Therefore, by using said material, in the form of a single sheet or a sandwich structure comprising two sheets, as a partition board, partition wall, screen, mobile screen or the like, or further as a wall material permeable to electromagnetic waves, in indoor spaces of intelligent offices and the like where communication interference and operation errors due to mutual interference or delay spread of electromagnetic waves may possibly occur, the electromagnetic wave absorbing effect as a transmission absorption loss upon transmission of electromagnetic waves can be brought about and interference and operation errors resulting from mutual interference or delay spread of electromagnetic waves can be prevented.

Furthermore, when the electromagnetic wave absorbing material according to the second aspect of the present invention is applied to the wall or ceiling of intelligent offices or the like or affixed to the metal surface of furniture placed in such offices, said metal surface serves as an electromagnetic wave reflecting surface and the electromagnetic wave absorbing effect as a reflection absorption loss upon low level reflection of electromagnetic waves can be achieved. Unnecessary indoor electromagnetic waves, while repeating reflection, are thus gradually absorbed and, as a result, the radio wave environment as a whole is improved.

The electromagnetic wave absorbing material according to the second aspect of the present invention, since its electromagnetic wave absorbing layer comprises an inorganic binder such as gypsum, is lightweight and resistant to flame.

it is excellent in handling properties, workability and other properties required of a building material. Therefore, the electromagnetic wave absorbing material according to the second aspect of the present invention is suitable as a building material for use as a partition board, partition wall, screen, mobile screen or the like in intelligent buildings or the like where interference and operation errors due to mutual interference or delay spread of electromagnetic waves are matters of no small concern. When it has an electromagnetic wave reflecting layer, said material is also suited for use as a building material, such as a wall or ceiling material, for intelligent offices or the like.

The electromagnetic wave absorbing material of the present invention, which has the above-mentioned constitution, can absorb electromagnetic waves in a narrow band or a plurality of band in frequencies from quasimicrowave bands to millimetric wave bands used for radio communication. In addition, it is lightweight and has flame resistance. Therefore, it is suited for use as a partition board in an intelligent office or the like. Furthermore, it is excellent, as a building material, in workability for fitting and in fitness and therefore can suitably be used as an indoor building material, for example a ceiling or wall material, in an intelligent office or the like.

BEST MODE FOR CARRYING OUT THE INVENTION

The following examples illustrate the present invention in further detail. They are by no means limitative of the scope of the present invention, however.

EXAMPLE 1

A slurry was prepared by blending 92.1 weight parts of calcined gypsum, 60 weight parts of water and 0.02 weight part of stainless steel fiber (fiber diameter 8 $\mu$m×6 mm) in a mixer. The slurry was spread over a base paper for gypsum board and, after thickness adjustment, overlaid with a further base paper for gypsum board. The whole was heated and dried at 100° C. to give an electromagnetic wave absorbing layer. The layer obtained had a thickness of 9.5 mm and a specific gravity of 0.8. The electromagnetic wave absorbing layer obtained was heated and the gypsum crystal water content was determined. The percent hydration of calcined gypsum was found to be 17%. Then, a 50 $\mu$m PET film with aluminum vapor deposited thereon (shielding ability 30 dB) was affixed to the back of said electromagnetic wave absorbing layer using an adhesive to give an electromagnetic wave absorbing material.

The thus-obtained electromagnetic wave absorbing material was tested for return loss at an oblique angle of incidence.

Return loss measurement at an oblique angle of incidence

The electromagnetic wave absorbing material was measured for electromagnetic wave return loss at an oblique angle of incidence of 45° using a neighboring electromagnetic field antenna measurement system (NFAMS; product of AICOM) at frequencies of 1.9 GHz, 2.45 GHz and 19 GHz in the TE mode. The results are shown in Table 1.

EXAMPLE 2

A slurry was prepared by blending 95.0 weight parts of calcined gypsum, 70 weight parts of water and 0.2 weight part of coal pitch-based carbon fiber (fiber diameter 10 $\mu$m×6 mm) in a mixer and, following the procedure of Example 1, an electromagnetic wave absorbing layer, i.e. an electromagnetic wave absorbing material comprising said electromagnetic wave absorbing layer, was produced. The electromagnetic wave absorbing material obtained had a thickness of 12.5 mm and a specific gravity of 0.8. Such electromagnetic wave absorbing material was affixed to the door of a steel closet using a double-faced adhesive tape and evaluated for return loss at an oblique angle of incidence in the same manner as in Example 1. The results are shown in Table 1.

EXAMPLE 3

A 100-$\mu$m-thick aluminum foil with a shielding ability of 30 dB was affixed to the back of the electromagnetic wave absorbing layer obtained in Example 2 using an adhesive. The thus-obtained electromagnetic wave absorbing material was evaluated for return loss at an oblique angle of incidence in the same manner as in Example 1. The results are shown in Table 1.

EXAMPLE 4

A slurry was prepared by blending 85.5 weight parts of calcined gypsum, 60 weight parts of water and 0.3 weight part of coal pitch-based carbon fiber (fiber diameter 10 $\mu$m×6 mm) in a mixer and, following the procedure of Example 1, an electromagnetic wave absorbing layer, i.e. an electromagnetic wave absorbing material comprising said electromagnetic wave absorbing layer, was produced. The electromagnetic wave absorbing material obtained had a thickness of 9.5 mm and a specific gravity of 0.8. It was affixed to the door of a closet in the same manner as in Example 2 and evaluated for return loss at an oblique angle of incidence. The results are shown in Table 1.

EXAMPLE 5

A 700-$\mu$m-thick paper vapor deposited with aluminum (shielding ability 25 dB) was affixed to the back of the electromagnetic wave absorbing layer obtained in Example 4 using an adhesive. The thus-obtained electromagnetic wave absorbing material was evaluated for return loss at an oblique angle of incidence in the same manner as in Example 1. The results are shown in Table 1.

EXAMPLE 6

A slurry was prepared by blending 85.5 weight parts of portland cement, 40 weight parts of water, 0.4 weight part of coal pitch-based carbon fiber (fiber diameter 10 μm×6 mm), and 2 weight parts of cellulose pulp and 2.0 weight parts of methylcellulose as a reinforcing fiber in a mixer. The slurry was cast into a framework, dehydrated under heating and aged to give an electromagnetic wave absorbing layer. The electromagnetic wave absorbing layer obtained had a thickness of 45 mm. Then, a 100-μm-thick aluminum foil (shielding ability 35 dB) was affixed to the back of the electromagnetic wave absorbing layer. The thus-obtained electromagnetic wave absorbing material was evaluated for return loss at an oblique angle of incidence in the same manner as in Example 1. The results are shown in Table 1.

COMPARATIVE EXAMPLE 1

A gypsum board was obtained in the same manner as in Example 2 except that the addition of coal pitch-based carbon fiber was omitted. The gypsum board obtained had a thickness of 12.5 mm and a specific gravity of 0.8. A 100-μm-thick aluminum foil (shielding ability 30 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 1.

COMPARATIVE EXAMPLE 2

A gypsum board was obtained in the same manner as in Example 4 except that the addition of coal pitch-based carbon fiber was omitted. The gypsum board obtained had a thickness of 9.5 mm and a specific gravity of 0.8. A 700-μm-thick paper with aluminum vapor deposited thereon (shielding ability 25 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 1.

sive to give an electromagnetic wave absorbing material. This material was measured for return loss at an oblique angle of incidence in the same manner as in Example 1. The results are shown in Table 2.

EXAMPLE 8

A slurry was prepared by blending 85.8 weight parts of calcined gypsum, 40 weight parts of water, 0.2 weight part of coal pitch-based carbon fiber (fiber diameter 10 μm×6 mm) and 3.4 weight parts of shirasu balloons in a mixer. Using the slurry, an electromagnetic wave absorbing layer was obtained in the same manner as in Example 5. The thus-obtained electromagnetic wave absorbing layer had a thickness of 12.5 mm and a specific gravity of 0.75. Then, a 100-μm- thick aluminum foil (shielding ability 30 dB) was affixed to the back of said electromagnetic wave absorbing layer using an adhesive and the thus-obtained electromagnetic wave absorbing material was measured for return loss at an oblique angle of incidence in the same manner as in Example 1. The results are shown in Table 2.

EXAMPLE 9

A slurry was prepared by blending 92.1 weight parts of calcined gypsum, 65 weight parts of water, 0.6 weight part of coal pitch-based carbon fiber (fiber diameter 10 μm×6 mm) and 8.0 weight parts of shirasu balloons in a mixer. Using the slurry, an electromagnetic wave absorbing layer was obtained in the same manner as in Example 5. The thus-obtained electromagnetic wave absorbing layer had a thickness of 9.5 mm and a specific gravity of 0.60. Then, a 700-μm-thick paper with aluminum vapor deposited thereon (shielding ability 25 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 2.

TABLE 1

|  |  | Example | | | | | | Comparative Example | |
|---|---|---|---|---|---|---|---|---|---|
|  |  | 1 | 2 | 3 | 4 | 5 | 6 | 1 | 2 |
| Return loss (dB) | 1.9 GHz | −2.3 | −4.0 | −4.1 | −10.2 | −10.5 | −5.3 | −0.3 | −0.3 |
|  | 2.45 GHz | −6.8 | −7.5 | −8.5 | −3.2 | −2.9 | −6.8 | −0.2 | −0.1 |
|  | 19 GHz | −4.5 | −9.5 | −8.9 | −4.6 | −4.1 | −7.0 | −1.0 | −0.2 |
| Specific gravity |  | 0.8 | 0.8 | 0.8 | 0.8 | 0.8 | — | — | 0.8 |

EXAMPLE 7

A slurry was prepared by blending 92.1 weight parts of calcined gypsum, 65 weight parts of water, 0.2 weight part of stainless steel fiber (fiber diameter 8 μm×6 mm) and 2.0 weight parts of perlite in a mixer. The slurry was spread over a base paper for gypsum board and, after thickness adjustment, overlaid with a further base paper for gypsum board. The whole was heated and dried at 100° C. to give an electromagnetic wave absorbing layer. The layer obtained had a thickness of 9.5 mm and a specific gravity of 0.75. The electromagnetic wave absorbing layer obtained was heated and the gypsum crystal water content was determined. The percent hydration of calcined gypsum was found to be 17%. Then, a 50 μm PET film with aluminum vapor deposited thereon (shielding ability 30 dB) was affixed to the back of said electromagnetic wave absorbing layer using an adhe-

EXAMPLE 10

A slurry was prepared by blending 85.5 weight parts of calcined gypsum, 40 weight parts of water, 0.2 weight part of coal pitch-based carbon fiber (fiber diameter 10 μm×6 mm) and 0.6 weight parts of polystyrene balloons (mean grain size 3 mm) in a mixer. Using the slurry, an electromagnetic wave absorbing layer was obtained in the same manner as in Example 5. The thus-obtained electromagnetic wave absorbing layer had a thickness of 12.5 mm and a specific gravity of 0.7. Then, a 100-μm-thick aluminum foil (shielding ability 30 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 2.

EXAMPLE 11

A slurry was prepared by blending 90 weight parts of portland cement, 45 weight parts of water, 0.4 weight part of coal pitch-based carbon fiber (fiber diameter 10 μm×6 mm), 2.3 weight parts of perlite, and 2 weight parts of cellulose pulp and 0.2 weight part of methylcellulose as a reinforcing fiber in a mixer. The slurry was cast into a framework, dehydrated under heating and aged to give an electromagnetic wave absorbing layer. The electromagnetic wave absorbing layer obtained had a thickness of 45 mm. Then, a 100-μm-thick aluminum foil (shielding ability 35 dB) was affixed to the back of the electromagnetic wave absorbing layer using an adhesive. The thus-obtained electromagnetic wave absorbing material was evaluated for return loss at an oblique angle of incidence in the same manner as in Example 1. The results are shown in Table 2.

EXAMPLE 12

A slurry was prepared by blending 85.5 weight parts of calcined gypsum, 40 weight parts of water, 0.5 weight part of coal pitch-based carbon fiber (fiber diameter 10 μm×6 mm) and 4.4 weight parts of expanded vermiculite in a mixer. Using the slurry, an electromagnetic wave absorbing layer was obtained in the same manner as in Example 5. The thus-obtained electromagnetic wave absorbing layer had a thickness of 9.5 mm and a specific gravity of 0.65. Then, a 700-μm-thick paper with aluminum vapor deposited thereon (shielding ability 25 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 2.

TABLE 2

| | | | Example | | | |
|---|---|---|---|---|---|---|
| | | 7 | 8 | 9 | 10 | 11 | 12 |
| Return | 1.9 GHz | -3.5 | -4.2 | -6.2 | -3.5 | -6.7 | -10.0 |
| loss | 2.45 GHz | -7.2 | -4.2 | -2.4 | -15.0 | -7.9 | -11.0 |
| (dB) | 19 GHz | -3.2 | -5.2 | -5.5 | -7.5 | -6.5 | -5.3 |
| Specific gravity | | 0.75 | 0.75 | 0.60 | 0.7 | — | 0.65 |

EXAMPLE 13

A slurry was prepared by blending 46.1 weight parts of calcined gypsum, 40 weight parts of water, 53.9 weight parts of a Mn—Mg—Zn ferrite powder and 0.01 weight part of stainless steel fiber (fiber diameter 8 μm×6 mm) in a mixer. The slurry was spread over a base paper for gypsum board and, after thickness adjustment, overlaid with a further base paper for gypsum board. The whole was heated and dried at 100° C. to give an electromagnetic wave absorbing layer. The layer obtained had a thickness of 9.5 mm and a specific gravity of 1.43. The electromagnetic wave absorbing layer obtained was heated and the gypsum crystal water content was determined. The percent hydration of calcined gypsum was found to be 17%. Then, a 50 μm PET film with aluminum vapor deposited thereon (shielding ability 30 dB) was affixed to the back of said electromagnetic wave absorbing layer using an adhesive and the thus-obtained electromagnetic wave absorbing material was measured for return loss at an oblique angle of incidence in the same manner as in Example 1. The results are shown in Table 3.

EXAMPLE 14

A slurry was prepared by blending 66.6 weight parts of calcined gypsum, 70 weight parts of water, 33.4 weight parts of a Mn—Mg—Zn ferrite powder and 0.02 weight part of coal pitch-based carbon fiber (fiber diameter 10 μm×6 mm) in a mixer. Using the slurry, an electromagnetic wave absorbing layer was obtained in the same manner as in Example 13. The electromagnetic wave absorbing layer had a thickness of 12.5 mm and a specific gravity of 1.30. Then, a 100-μm-thick aluminum foil (shielding ability 30 dB) was affixed to the back of said electromagnetic wave absorbing layer using an adhesive and the thus-obtained electromagnetic wave absorbing material was measured for return loss at an oblique angle of incidence in the same manner as in Example 1. The results are shown in Table 3.

EXAMPLE 15

A slurry was prepared by blending 77.4 weight parts of calcined gypsum, 60 weight parts of water, 22.6 weight parts of a Mn—Zn ferrite powder and 0.06 weight part of coal pitch-based carbon fiber (fiber diameter 10 μm×6 mm) in a mixer. Using the slurry, an electromagnetic wave absorbing layer was obtained in the same manner as in Example 13. The thus-obtained electromagnetic wave absorbing layer had a thickness of 9.5 mm and a specific gravity of 1.20. Then, a 700-μm-thick paper with aluminum vapor deposited thereon (shielding ability 25 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 3.

EXAMPLE 16

A slurry was prepared by blending 70 weight parts of portland cement, 30 weight parts of water, 20 weight parts of a Mn—Zn ferrite powder, 0.04 weight part of coal pitch-based carbon fiber (fiber diameter 10 μm×6 mm), and 2 weight parts of cellulose pulp and 0.2 weight part of methylcellulose as a reinforcing fiber in a mixer. The slurry was cast into a framework, heated and dehydrated, and aged to give an electromagnetic wave absorbing layer. The electromagnetic wave absorbing layer obtained had a thickness of 45 mm. Then, a 100-μm-thick aluminum foil (shielding ability 35 dB) was affixed to the back of said electromagnetic wave absorbing layer and the thus-obtained electromagnetic wave absorbing material was measured for return loss at an oblique angle of incidence in the same manner as in Example 1. The results are shown in Table 3.

COMPARATIVE EXAMPLE 3

An electromagnetic wave absorbing layer was obtained in the same manner as in Example 14 except that the addition of coal pitch-based carbon fiber was omitted. The electromagnetic wave absorbing layer obtained had a thickness of 12.5 mm and a specific gravity of 1.30. A 100-μm-thick aluminum foil (shielding ability 30 dB) was affixed to the back of said electromagnetic wave absorbing layer in the same manner as in Example 14, using an adhesive. The thus-obtained electromagnetic wave absorbing material was measured for return loss at an oblique angle of incidence in the same manner as in Example 1. The results are shown in Table 3.

COMPARATIVE EXAMPLE 4

An electromagnetic wave absorbing layer was obtained in the same manner as in Example 15 except that the addition of coal pitch-based carbon fiber was omitted. The electromagnetic wave absorbing layer obtained had a thickness of 9.5 mm and a specific gravity of 1.20. A 700-μm-thick paper with aluminum vapor deposited thereon (shielding ability 25 dB) was affixed to the back of said electromagnetic wave absorbing layer in the same manner as in Example 15, using an adhesive. The thus-obtained electromagnetic wave absorbing material was evaluated for return loss at an oblique angle of incidence in the same manner as in Example 1. The results are shown in Table 3.

TABLE 3

|  |  | Example | | | | Comparative Example | |
| --- | --- | --- | --- | --- | --- | --- | --- |
|  |  | 13 | 14 | 15 | 16 | 3 | 4 |
| Return | 1.9 GHz | −6.8 | −10.3 | −7.8 | −6.4 | −2.8 | −1.4 |
| loss | 2.45 GHz | −6.5 | −8.6 | −8.9 | −8.7 | −4.3 | −2.7 |
| (dB) | 19 GHz | −13.3 | −15.5 | −9.5 | −10.0 | −2.6 | −1.6 |
| Specific gravity |  | 1.43 | 1.30 | 1.20 | — | 1.30 | 1.20 |

EXAMPLE 17

A slurry was prepared by blending 46.1 weight parts of calcined gypsum, 40 weight parts of water, 53.9 weight parts of a Mn—Mg—Zn ferrite powder, 0.05 weight part of stainless steel fiber (fiber diameter 8 μm×6 mm) and 2.0 weight parts of perlite in a mixer. The slurry was spread over a base paper for gypsum board and, after thickness adjustment, overlaid with a further base paper for gypsum board. The whole was heated and dried at 100° C. to give an electromagnetic wave absorbing layer. The layer obtained had a thickness of 9.5 mm and a specific gravity of 1.20. The electromagnetic wave absorbing layer obtained was heated and the gypsum crystal water content was determined. The percent hydration of calcined gypsum was found to be 17%. Then, a 50 μm PET film with aluminum vapor deposited thereon (shielding ability 30 dB) was affixed to the back of said electromagnetic wave absorbing layer using an adhesive. The thus-obtained electromagnetic wave absorbing material was evaluated for return loss at an oblique angle of incidence in the same manner as in Example 1. The results are shown in Table 4.

EXAMPLE 18

A slurry was prepared by blending 69.8 weight parts of calcined gypsum, 70 weight parts of water, 26.8 weight parts of a Mn—Mg—Zn ferrite powder, 0.04 weight part of coal pitch-based carbon fiber (fiber diameter 10 μm×6 mm) and 3.4 weight parts of shirasu balloons in a mixer. Using the slurry, an electromagnetic wave absorbing layer was obtained in the same manner as in Example 17. The electromagnetic wave absorbing layer obtained had a thickness of 12.5 mm and a specific gravity of 1.00. Then, a 100-μm-thick aluminum foil (shielding ability 30 dB) was affixed to the back of said electromagnetic wave absorbing layer using an adhesive and the thus-obtained electromagnetic wave absorbing material was evaluated for return loss at an oblique angle of incidence in the same manner as in Example 1. The results are shown in Table 4.

EXAMPLE 19

A slurry was prepared by blending 54.6 weight parts of calcined gypsum, 99 weight parts of water, 37.5 weight parts of a Mn—Zn ferrite powder, 0.05 weight part of coal pitch-based carbon fiber (fiber diameter 10 μm×6 mm) and 8.0 weight parts of shirasu balloons in a mixer. Using the slurry, an electromagnetic wave absorbing layer was obtained in the same manner as in Example 17. The electromagnetic wave absorbing layer obtained had a thickness of 9.5 mm and a specific gravity of 0.70. Then, a 700-μm-thick paper with aluminum vapor deposited thereon (shielding ability 25 dB) was affixed to the back of said electromagnetic wave absorbing layer using an adhesive. The thus-obtained electromagnetic wave absorbing material was evaluated for return loss at an oblique angle of incidence in the same manner as in Example 1. The results are shown in Table 4.

EXAMPLE 20

A slurry was prepared by blending 72.4 weight parts of calcined gypsum, 65.1 weight parts of water, 27.0 weight parts of a Mn—Mg—Zn ferrite powder, 0.06 weight part of coal pitch-based carbon fiber (fiber diameter 10 μm×6 mm) and 0.6 weight part of polystyrene balloons (mean grain size 3 mm) in a mixer. Using the slurry, an electromagnetic wave absorbing layer was obtained in the same manner as in Example 17. The electromagnetic wave absorbing layer obtained had a thickness of 12.5 mm and a specific gravity of 1.00. Then, a 100-μm-thick aluminum foil (shielding ability 30 dB) was affixed to the back of said electromagnetic wave absorbing layer using an adhesive. The thus-obtained electromagnetic wave absorbing material was evaluated for return loss at an oblique angle of incidence in the same manner as in Example 1. The results are shown in Table 4.

EXAMPLE 21

A slurry was prepared by blending 70 weight parts of portland cement, 30 weight parts of water, 20 weight parts of a Mn—Zn ferrite powder, 0.04 weight part of coal pitch-based carbon fiber (fiber diameter 10 μm×6 mm), 2.3 weight parts of perlite, and 2 weight parts of cellulose pulp and 0.2 weight part of methylcellulose as a reinforcing fiber in a mixer. The slurry was cast into a framework, heated and dehydrated, and aged to give an electromagnetic wave absorbing layer. The electromagnetic wave absorbing layer obtained had a thickness of 45 mm. Then, a 100-μm-thick aluminum foil (shielding ability 35 dB) was affixed to the back of said electromagnetic wave absorbing layer using an adhesive. The thus-obtained electromagnetic wave absorbing material was evaluated for return loss at an oblique angle of incidence in the same manner as in Example 1. The results are shown in Table 4.

EXAMPLE 22

A slurry was prepared by blending 68.8 weight parts of calcined gypsum, 68.6 weight parts of water, 26.8 weight parts of a Mn—Zn ferrite powder, 0.05 weight part of coal pitch-based carbon fiber (fiber diameter 10 μm×6 mm) and 4.4 weight parts of expanded vermiculite in a mixer. Using the slurry, an electromagnetic wave absorbing layer was obtained in the same manner as in Example 17. The electromagnetic wave absorbing layer obtained had a thickness of 9.5 mm and a specific gravity of 1.00. Then, a 700-μm-thick paper with aluminum vapor deposited thereon (shielding ability 25 dB) was affixed to the back of said electromagnetic wave absorbing layer using an adhesive. The thus-obtained electromagnetic wave absorbing material was evaluated for return loss at an oblique angle of incidence in the same manner as in Example 1. The results are shown in Table 4.

TABLE 4

| | | Example | | | | | |
|---|---|---|---|---|---|---|---|
| | | 17 | 18 | 19 | 20 | 21 | 22 |
| Return | 1.9 GHz | −6.2 | −7.2 | −6.1 | −6.2 | −8.2 | −6.5 |
| loss | 2.45 GHz | −9.3 | −8.6 | −8.5 | −8.7 | −8.8 | −8.5 |
| (dB) | 19 GHz | −11.3 | −10.5 | −9.5 | −9.6 | −10.3 | −10.2 |
| Specific gravity | | 1.20 | 1.00 | 0.70 | 1.00 | — | 1.00 |

EXAMPLE 23

A slurry was prepared by blending 77.4 weight parts of calcined gypsum, 66 weight parts of water, 22.6 weight parts of a Mn—Zn ferrite powder and 0.06 weight part of coal pitch-based carbon fiber (fiber diameter 10 μm×6 mm) in a mixer. The slurry was spread over a base paper for gypsum board and, after thickness adjustment, overlaid with a further base paper for gypsum board. The whole was heated and dried at 100° C. to give an electromagnetic wave absorbing material comprising an electromagnetic wave absorbing layer alone. The material obtained had a thickness of 9.5 mm and a specific gravity of 1.0. The electromagnetic wave absorbing material obtained was heated and the gypsum crystal water content was determined. The percent hydration of calcined gypsum was found to be 17%.

The electromagnetic wave absorbing material obtained was subjected to loss measurements at 2.45 GHz by the reflection and transmission methods using a network analyzer. The return loss was −9.9 dB and the transmission loss was −6.5 dB. The absorption was calculated to be 67.1%.

EXAMPLE 24

A slurry was prepared by blending 74.4 weight parts of calcined gypsum, 60 weight parts of water, 22.6 weight parts of a Mn—Zn ferrite powder, 3.5 weight parts of shirasu balloons and 0.04 weight part of coal pitch-based carbon fiber (fiber diameter 10 μm×6 mm) in a mixer. The slurry was spread over a base paper for gypsum board and, after thickness adjustment, overlaid with a further base paper for gypsum board. The whole was treated in the same manner as in Example 23 to give an electromagnetic wave absorbing material comprising an electromagnetic wave absorbing layer alone. The material obtained had a thickness of 12.5 mm and a specific gravity of 0.8. The electromagnetic wave absorbing material obtained was heated and the gypsum crystal water content was determined. The percent hydration of calcined gypsum was found to be 17%.

The electromagnetic wave absorbing material obtained was subjected to loss measurements at 2.45 GHz by the reflection and transmission methods using a network analyzer. The return loss was −15.2 dB and the transmission loss was −8.0 dB. The absorption was calculated to be 80.9%.

EXAMPLE 25

The electromagnetic wave absorbing material obtained in Example 24 was affixed to the surface of a screen made of a painted steel sheet using an adhesive and bolts and nuts made of a polycarbonate and subjected to return loss measurements at an oblique angle of incidence using a neighboring electromagnetic field antenna measurement system. The return loss was −7.5 dB at 1.9 GHz, −9.2 dB at 2.45 GHz and −10.6 dB at 19 GHz.

What is claimed is:

1. An electromagnetic wave absorbing material which comprises an electromagnetic wave absorbing layer comprising a hydraulic inorganic binder (a) and 0.01 to 0.54 part by weight, per 100 parts by weight of said hydraulic inorganic binder (a), of a fibrous conductor (b), and further comprises an electromagnetic wave reflecting layer.

2. The electromagnetic wave absorbing material according to claim 1, wherein said hydraulic inorganic binder (a) comprises at least one member selected from the group consisting of cement, mortar, calcium silicate and gypsum and wherein said electromagnetic wave absorbing layer has a thickness of 5 to 50 mm.

3. The electromagnetic wave absorbing material according to claim 2, wherein said hydraulic inorganic binder (a) is gypsum and wherein said electromagnetic wave absorbing layer further comprises at least one additive (c) selected from the group consisting of an expandable filler (c-1), a fibrous additive (c-2), a foaming agent (c-3), a water reducing agent (c-4) and a surfactant (c-5) and the amount of said additive (c) being 0.01 to 20 parts by weight, per 100 parts by weight of the hydraulic inorganic binder (a), said layer having a thickness of 7 to 25 mm and a specific gravity of 0.50 to 0.90.

4. The electromagnetic wave absorbing material according to claim 3, wherein said additive (c) is at least one expandable filler (c-1) selected from among organic expandable fillers and inorganic expandable fillers.

5. The electromagnetic wave absorbing material according to claim 1, wherein said electromagnetic wave reflecting layer comprises at least one member selected from the group consisting of conductive substrates, metal vapor deposited film, metal foils and metal powders and has a shielding ability of not less than 20 dB.

6. An electromagnetic wave absorbing material which comprises an electromagnetic wave absorbing layer consisting essentially of a hydraulic inorganic binder (a) and 0.01 to 0.54 parts by weight, per 100 parts by weight of said hydraulic inorganic binder (a), of a fibrous conductor (b), and further comprises an electromagnetic wave reflecting layer.

7. An electromagnetic wave absorbing layer consisting essentially of a hydraulic inorganic binder (a) and 0.01 to 0.54 parts by weight, per 100 parts by weight of said hydraulic inorganic binder (a), of a fibrous conductor (b) and at least one additive (c) selected from the group consisting of an expandable filler (c-1), a fibrous additive (c-2), a foaming agent (c-3), a water reducing agent (c-4) and a surfactant (c-5) with the amount of (c) being 0.01 to 20 parts by weight per 100 parts by weight of the hydraulic inorganic binder (a).

\* \* \* \* \*